(12) United States Patent
Lu (10) Patent No.: US 10,277,042 B2
(45) Date of Patent: Apr. 30, 2019

(54) MULTI-FUNCTIONAL CHARGER (71) Applicant: Ningyuan Lu, Ningbo (CN)

(72) Inventor: Ningyuan Lu, Ningbo (CN)

( * ) Notice: Subject to any disclaimer, the term of this patent is extended or adjusted under 35 U.S.C. 154(b) by 0 days.

(21) Appl. No.: 15/503,408

(22) PCT Filed: Aug. 3, 2015

(86) PCT No.: PCT/CN2015/085922
§ 371 (c)(1),
(2) Date: Feb. 13, 2017

(87) PCT Pub. No.: WO2016/023428
PCT Pub. Date: Feb. 18, 2016

(65) Prior Publication Data
US 2017/0229890 A1 Aug. 10, 2017

(30) Foreign Application Priority Data
Aug. 15, 2014 (CN) .......................... 2014 1 0402362

(51) Int. Cl.
*H02J 7/00* (2006.01)
(52) U.S. Cl.
CPC ........... *H02J 7/0042* (2013.01); *H02J 7/0027* (2013.01); *H02J 7/0044* (2013.01); *H02J 2007/0062* (2013.01)
(58) Field of Classification Search
None
See application file for complete search history.

(56) References Cited

U.S. PATENT DOCUMENTS

| 6,612,875 | B1 * | 9/2003 | Liao | ................... | H01R 13/2421 |
| | | | | | 439/638 |
| 7,637,746 | B2 * | 12/2009 | Lindberg | ........... | H01R 13/6205 |
| | | | | | 439/38 |
| 8,633,674 | B2 * | 1/2014 | Law | ...................... | H02J 7/0045 |
| | | | | | 320/110 |
| 8,994,330 | B2 * | 3/2015 | Kuo | ..................... | H01R 25/003 |
| | | | | | 320/111 |

(Continued)

FOREIGN PATENT DOCUMENTS

CN 202134719 U 2/2012
CN 103560570 A 2/2014
(Continued)

*Primary Examiner* — Leigh M Garbowski
(74) *Attorney, Agent, or Firm* — Gokalp Bayramoglu (57) ABSTRACT

The multi-functional charger includes a charger body, circuit board and an external charging plug, wherein the circuit board is arranged in the charger body and electrically connected with the external charging plug; the external charging plug is detachably connected with one end of the charger body and electrically connected with the circuit board through a connecting cable; a containing cavity is formed in the charger body and used for containing the connecting cable; the charger body is further provided with at least one mounting groove, the interiors of all the mounting grooves are respectively and detachably, connected with a functional assembly, and each functional assembly are in electric connection with the circuit board; the functional assembly includes a retractable USB assembly for the cable connection and a charging power assembly for electric energy storage.

11 Claims, 6 Drawing Sheets

(56) References Cited

U.S. PATENT DOCUMENTS

| | | | |
|---|---|---|---|
| 9,793,750 B2* | 10/2017 | Miller | H02J 7/1423 |
| 2007/0238350 A1* | 10/2007 | Azoulay | H01R 31/065 |
| | | | 439/501 |
| 2009/0108802 A1 | 4/2009 | Wu | |
| 2016/0040825 A1* | 2/2016 | Franklin | F16M 13/02 |
| | | | 439/39 |

FOREIGN PATENT DOCUMENTS

| | | |
|---|---|---|
| CN | 104167792 A | 11/2014 |
| CN | 204012859 U | 12/2014 |

\* cited by examiner

MULTI-FUNCTIONAL CHARGER

CROSS REFERENCE TO RELATED APPLICATIONS

This application is the national phase entry of International Application No. PCT/CN2015/085922, filed on Aug. 3, 2015, which is based upon and claims priority to Chinese Patent Application No. 201410402362.3, filed on Aug. 15, 2014, the entire contents of which are incorporated herein by reference.

TECHNICAL FIELD

The present disclosure relates to the field of charging equipment, and particularly relates to a multi-functional charger.

BACKGROUND OF THE INVENTION

A charger is mainly a device for charging the digital products, but the charger of the prior art has the following disadvantages:

1. Since the charger plug of the prior art is fixed on the charger body, when the charger plug is inserted in the power socket or socket, the charger body usually blocks a large area of the socket due to its large volume, preventing the insertion of other plugs of the electrical appliances. Meanwhile, the connection of the charger and the digital products has to be realized by a long connecting cable.

2. The design of the charger structure of the prior art results in a large volume and difficulty for carriage.

3. The USB connecting cable is widely applied in the charging and data transfer for digital products nowadays, however, the charger of the prior art is not provided with a USB connecting cable, instead, a USB charging interface is provided to only fulfill the function of charging. An additional data cable is required for the data transfer. For different data cables may be adapted to different electrical appliances, a plurality of data cables may be needed to be carried, and stored and potential winding problems may be caused.

SUMMARY OF THE INVENTION

The present disclosure relates to a multi-functional charger, which enables the user to charge multiple electrical appliances with one multi-functional charger, replacing all the loose charging devices such as a power cable, a charger, the charging or data cables, backup battery, and the like. The multi-functional charger is convenient to use, portable to carry and diversified in function.

The technical scheme is as follows: a multi-functional charger, comprises a charger body, a circuit board and an external charging plug, wherein the circuit board is arranged in the charger body and electrically connected with the external charging plug; the external charging plug is detachably connected with one end of the charger body and electrically connected with the circuit board through a connecting cable; a containing cavity is formed in the charger body and used for containing the connecting cable; the charger body is further provided with at least one mounting groove, the interiors of all the mounting grooves are respectively and detachably connected with a functional assembly and each functional assembly is in electric connection with the circuit board; the functional assembly comprises a retractable USB assembly for the cable connection and a charging power assembly for electric energy storage.

Comparing with the structure of the prior art, the advantages of the present disclosure mentioned above include the following: the external charging plug, and the charger body are detachably connected and electrically connected with the circuit board through a connecting cable, thus the external charging plug can be detached from the charger body and inserted into the power socket or a socket without affecting the use of other plugs of electric appliances, and since the external charging plug is always electrically connected with the circuit board through a comparatively long connecting cable, so that the external charging plug and the charger can be farther apart, being more comfortable and convenient; the long connecting cable can be placed in the containing cavity, this there is no exposure of the cable when not in use to achieve a clean appeal other than convenience; the charger body is further provided with at least one mounting groove, the interiors of all the mounting grooves are respectively and detachably connected with a functional assembly, e.g. a retractable USB assembly; when the charging cable is not long enough, one of the USB plug connectors of the retractable USB assembly can be pulled out and connected to the digital product needs to be charged. The entire retractable USB assembly can be removed from the charger and functions as a USB connecting cable for data transfer since the retractable USB assembly is equivalent to a double-pull USB charging cable. If the functional assembly is set as a power charging assembly, when the external charging plug is connected to an external power supply, the power charging assembly will be charged by the circuit board, and when the external charging plug is disconnected, the power charging assembly can be used as a power supply to the digital products plugged in the charger body. The function of the charger varies according to different functional assemblies, and the compact design of the charger structure results in a relatively small volume.

Preferably, the external charging plug is detachably connected with a connector in the charger body by insertion; one end of the connecting cable is electrically connected with the circuit board, and the other end with the connector; the external charging plug is also magnetically connected with the charger body. One of the purposes of setting a connector in the charger body and electrically connected with the external charging plug is to make the connecting cable, the connector and the external charging plug as a whole and move together when the external charging plug does not need to be replaced. If the charger body is relatively far away from the socket, the external charging plug and the connector can be detached from the charger body, and electrically connected with the circuit board by the connecting cable. And when the external charging plug is not suitable for the socket, it can be replaced accordingly, that is, to detach the plug from the charger, and insert a suitable one to the connector. The charger in this disclosure provides a wide adaptability for different sockets by the replacement of the external charging plug.

Preferably, the two ends of the bottom plate of the containing cavity bent downward to form an arc-shaped space to place the folded connecting cable at both ends of the containing cavity. The connecting lines should not be over-folded which may shorten its service life, and normally, the two ends of the folded connecting lines project outwardly, thus by forming the arc-shaped space at both ends of the containing cavity, the folded connecting line can be well accommodated in the containing cavity without being squeezed. In some extend, the service life of the connecting cable is increased, and so is the charger.

Preferably, a first USB interface connected with the circuit board is provided in each mounting groove and a first USB plug set on the fixed connector on the functional assembly can be inserted in the first USB it and the functional assembly is also magnetically connected with the charger body. The first USB interface and the first USB plug has formed a detachable connection by insertion, and the functional assembly and the charger body has formed a detachable connection by the magnetic force. It's convenient for the disassembly and assembly in both ways of connections and no other accessory structure is needed to connect the both, thus the cost for other accessory structure is saved.

Preferably the connecting cable is further sleeved with a plurality of magnetic covers for easier cable folding. The magnetic covers contribute to a neater folding of the connecting cable and make it more suitable and accurate to be placed in the containing chamber without being squeezed.

Preferably, the charger body (1) is a triangle in cross-section, and the three corners of the triangle are processed by chamfering. The cross-section of the charger body is made into a triangular, which is easy to grasp, and stable when in placement, and the three corners of the triangle are processed by chamfering processing to prevent accidental scratching of the hand, and reduces the potential safety hazard.

Preferably, the other end of the charger body is further provided with a second USB interface. When it is required to charge more digital product, the second USB interface can be inserted for charging.

Preferably the retractable USB assembly comprises a fixed connector and a retractable flap cable box; the fixed connector is provided with a first USB plug and a rotary wheel with circular groove set in the retractable flap cable box; a second USB plug is clamped and placed in the circular groove and hidden when the retractable flap cable box gathers with the charger body; the rotary wheel is wound with a data cable; one end of the data cable is electrically connected with the first USB plug, and the other end with the second USB plug; the retractable flap cable box is also magnetically connected with the charger body. The entire retractable USB assembly is equivalent to a double-pull USB charging cable. When the connecting cable is not long enough for the digital product to reach the charger, the user can reveal the retractable flap cable box from the mounting groove; pull and stretch outwardly the second USB plug in the circular groove of the retractable flap cable box to extend the cable, since the first USB plug on the fixed connector is in constant electrical connection with the circuit board, it is sufficient to insert the second USB plug into the digital products at a remote location for charging. To perform data transmission without a USB connecting cable, the user can unplug the first USB plug from the first USB interface to separate the fixed connector from the charger body, and remove the retractable flap cable box from the charger body; the entire retractable USB assembly can be used as a double-pull USB extension cable, also functions as a USB connecting cable to fulfill the data transmission.

Preferably, the power charging assembly comprises a fixed connector and a flap, the fixed connector is provided with a first USB plug, and the flap with a rechargeable battery; the first USB plug is electrically connected with the rechargeable battery; the fixed connector is fixedly connected with the flap and the flap is also magnetically connected with the charger body. Once the charging power supply is set, the charger can be used as a portable battery. With various functions of the charger, the disassembly of the power charging assembly can be simply. The fixed connector is mounted on the flap, thus the power charging assembly can be taken out with a slight force after unplugging the first USB plug from the first. USB interface.

Preferably, the circuit board is provided with a master control unit (WU), and a sample identification circuit for digital products is arranged between the main control MCU and the first USB interface to identify whether to charge or discharge. The digital products requiring charging or the power charging assembly to charge other digital products inserted on the first USB interface can be detected by the sample identification circuit, and based on the detection, the internal circuit will be adjusted accordingly for charging or discharging. The first USB interface is capable of charging and discharging.

REFERENCE NUMBERS 1. charger body; 2. circuit board; 3. external charging plug; 4. containing cavity; 5. mounting groove; 6. functional assembly; 7. connector; 8. the first USB interface; 9. fixed connector; 10. plug cover; 11. upper cover.

DETAILED DESCRIPTION OF THE INVENTION

With reference to the accompanying drawings and the embodiments, the present disclosure is further described, but not limited to the following embodiment.

Figure 1:
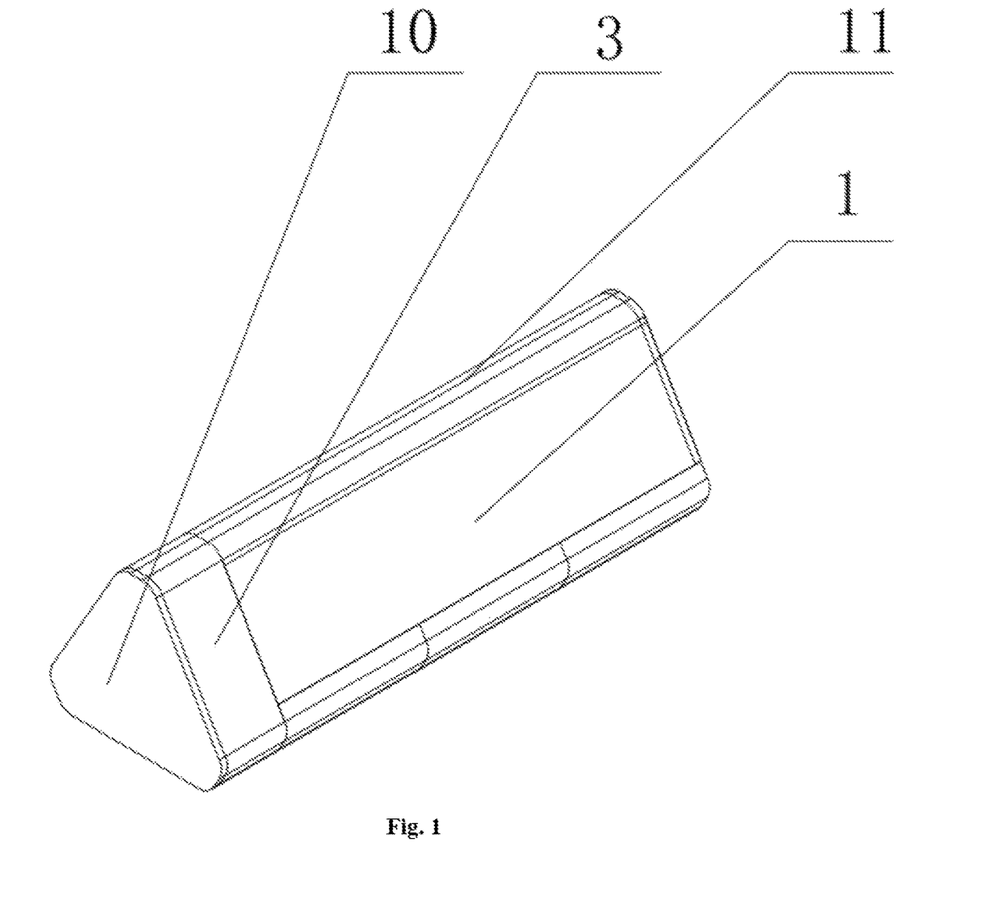
FIG. 1 illustrates an overall structural diagram of a Multi-functional charger.
Figure 2:
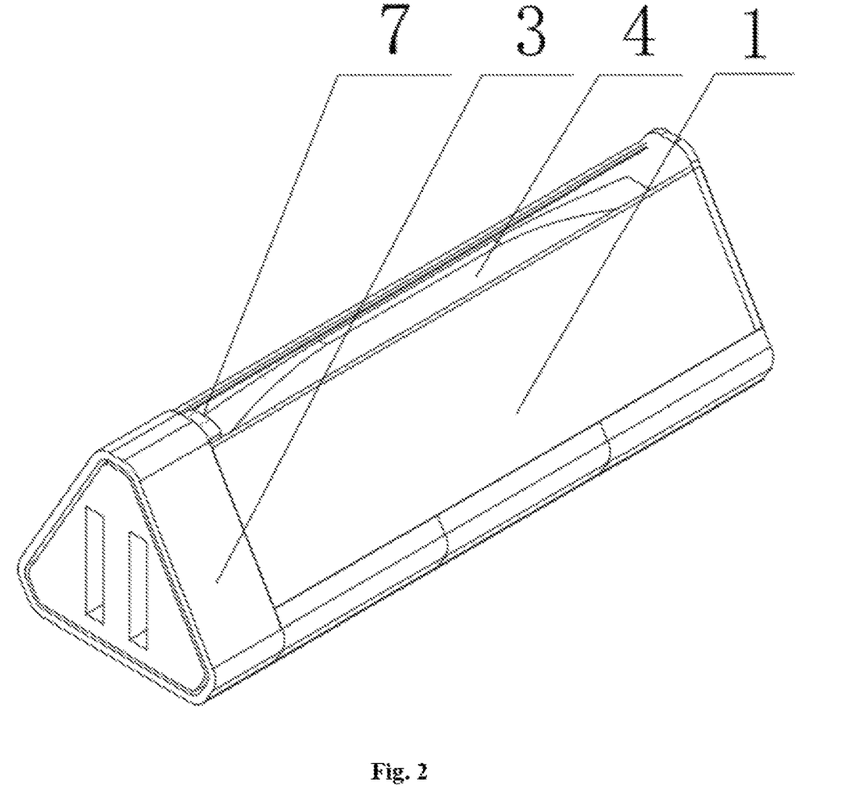
FIG. 2 illustrates a structural diagram of FIG. 1 after removing the plug cover and the upper cover.

As indicated, a multi-functional charger, comprises charger body 1, circuit board 2 and external charging plug 3, wherein circuit. board 2 is arranged in charger body 1 and electrically connected with external charging plug 3; external charging plug 3 is detachably connected with one end of charger body 1 and electrically connected with circuit board 2 through a connecting cable; containing cavity 4 is formed in charger body 1 and used for containing the connecting cable; charger body 1 is further provided with at least one mounting groove 5, the interiors of all mounting grooves 5 are respectively and detachably connected with functional assembly 6, and each functional assembly 6 is in electric connection with circuit board 2; functional assembly 6 comprises a retractable USB assembly for the cable connection and a charging power assembly for electric energy storage. External charging plug 3 is sleeved with plug cover 10, and external charging plug 3 includes a plug base and a plug. The plug is rotatably connected to the plug base, and the plug can be rotated 90 degrees when in use. The upper part of containing cavity 4 is also provided with upper cover 11, thus the whole surface of the multi-functional charger does not have a hole or a protrusion with the covers on. With a compact structure, the charger body includes: (from top to bottom) upper cover 11, containing cavity 4, bottom plate of containing cavity 4, circuit board 2, upper plate of mounting groove 5 and functional assembly 6. And the cross-section of the charger body is a triangle which takes relatively smaller occupation. The number of mounting groove 5 is to be three preferably most, including two retractable USB assemblies and one power charging assembly. Mounting groove 5 can also be referred to as a mounting base.

Figure 3:
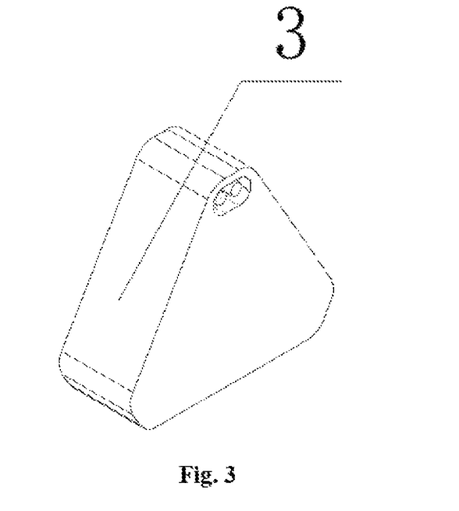
FIG. 3 illustrates a structural diagram of the external charging plug of the multi-functional charger.
Figure 4:
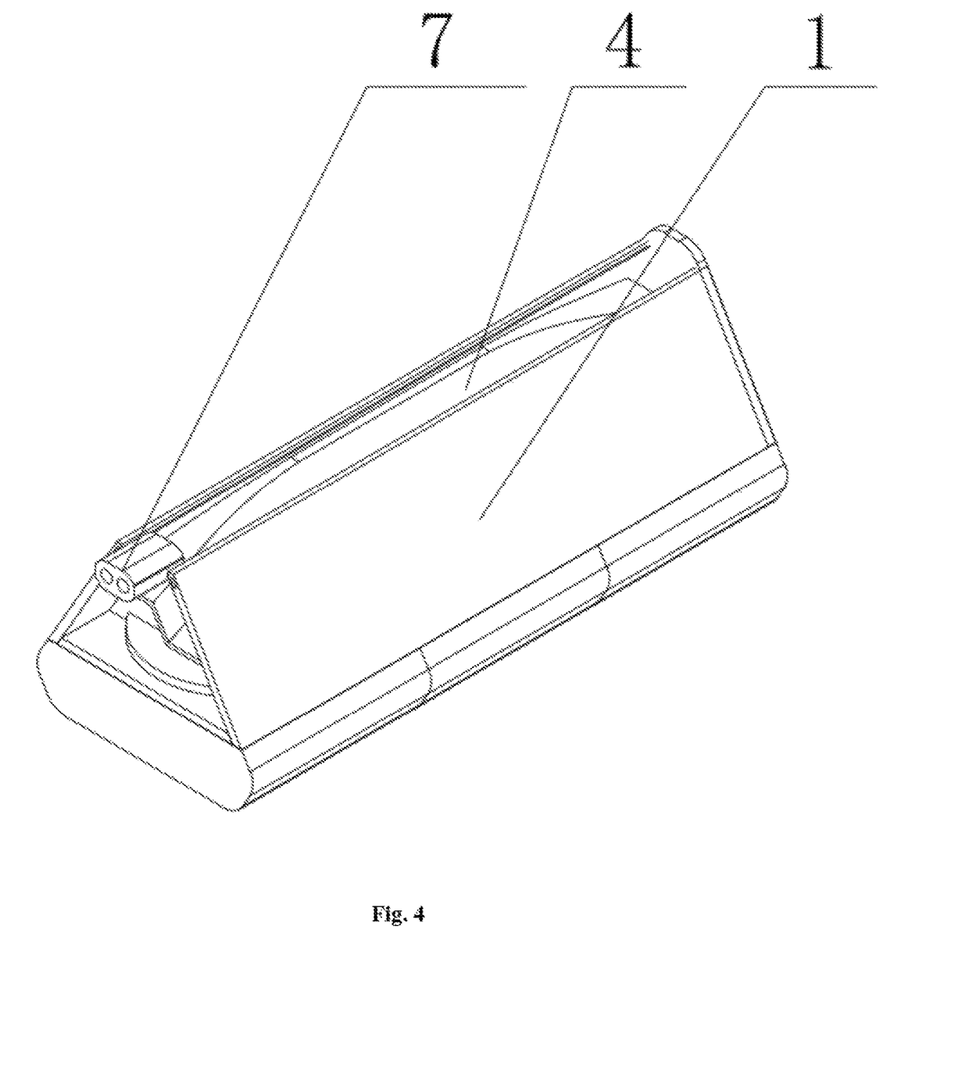
FIG. 4 illustrates a structural diagram of FIG. 2 after removing the external charging plug.

External charging plug 3 is detachably connected with connector 7 in charger body 1 by insertion; one end of the connecting cable is electrically connected with circuit board 2, and the other end with connector 7; external charging plug 3 is also magnetically connected with charger body 1. External charging plug 3 includes a plug base and a plug, and plug is rotatably connected with one end of the plug base, while the other end of the plug base has the insertion holes for inserting connector 7. Connector 7 can be inserted into the insertion holes, and has no limiting relationship with charger body 1. Connecting head 7 is provided in charger body 1 through upper cover 11. External charging plug 3 and charger body 1 are magnetically connected since the three corners of the other end of the plug base of external charging plug 3 are respectively provided with magnets, and charger body 1 is also made of magnetic material.

The two ends of the bottom plate of containing cavity 4 bent downward to form an arc-shaped space to place the folded connecting cable at both ends of containing cavity 4. End of the bottom plate of containing cavity 4 which is far away from external charging plug 3 is also provided with a through hole electrically connected with circuit board 2 to insert the connecting cable.

The interiors of all mounting grooves 5 are respectively and detachably connected with functional assembly 6; first USB interface 8 connected with circuit board 2 is provided in each mounting groove 5 and a first USB plug set on fixed connector 9 on functional assembly 6 can be inserted in first USB interface 8 and functional assembly 6 is also magnetically connected with charger body 1.

As shown in the drawings, first USB interface 8 is facing outward and the first USB plug of fixed connector 9 is facing inward, thus the first USB plug can be easily inserted into first USB interface 8. Mounting groove 5 comprises a circular groove, which coordinates with a circular protrusion on functional assembly 6. functional assembly 6 and charger body 1 are also connected through a magnetic force since the four corners of the flap of functional assembly 6 are respectively arranged with magnets, and charger body 1 is made of magnetic material, so that the flap can be well attached on charger body 1.

The connecting cable is further sleeved with a plurality of magnetic covers for easier cable folding. The magnetic cover is directly sleeved on the connecting cable and in pairs. When the connecting cable is folded, the two pairs of the magnetic cover are adsorbed to make the folding more convenient and more accurate. The connecting cables are not shown in the figures, neither are the magnetic covers.

Figure 5:
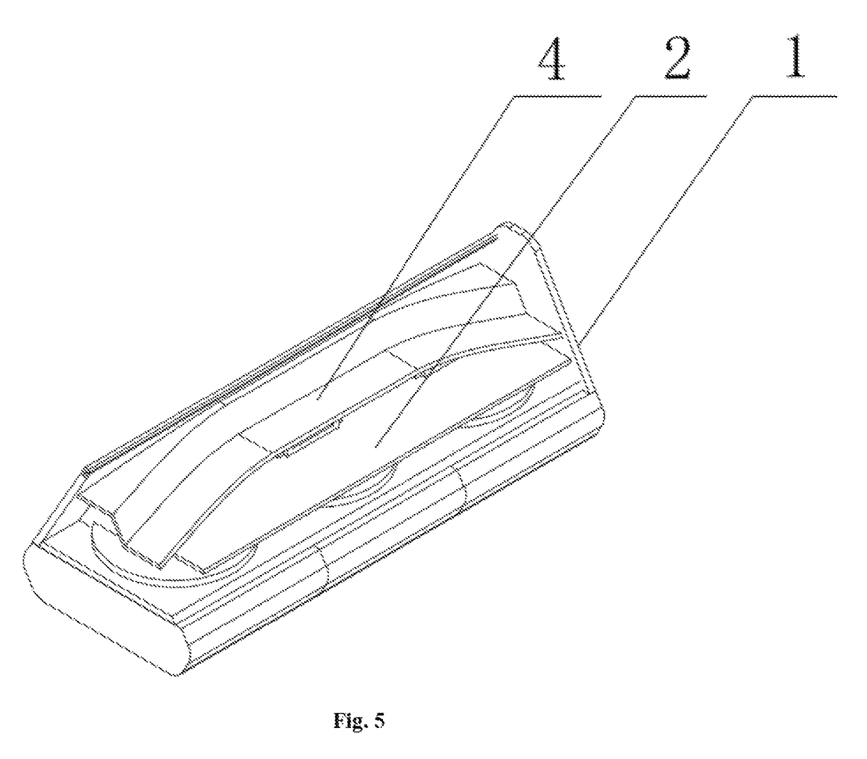
FIG. 5 illustrates a structural diagram of FIG. 4 after removing the connector and right side plate.
Figure 6:
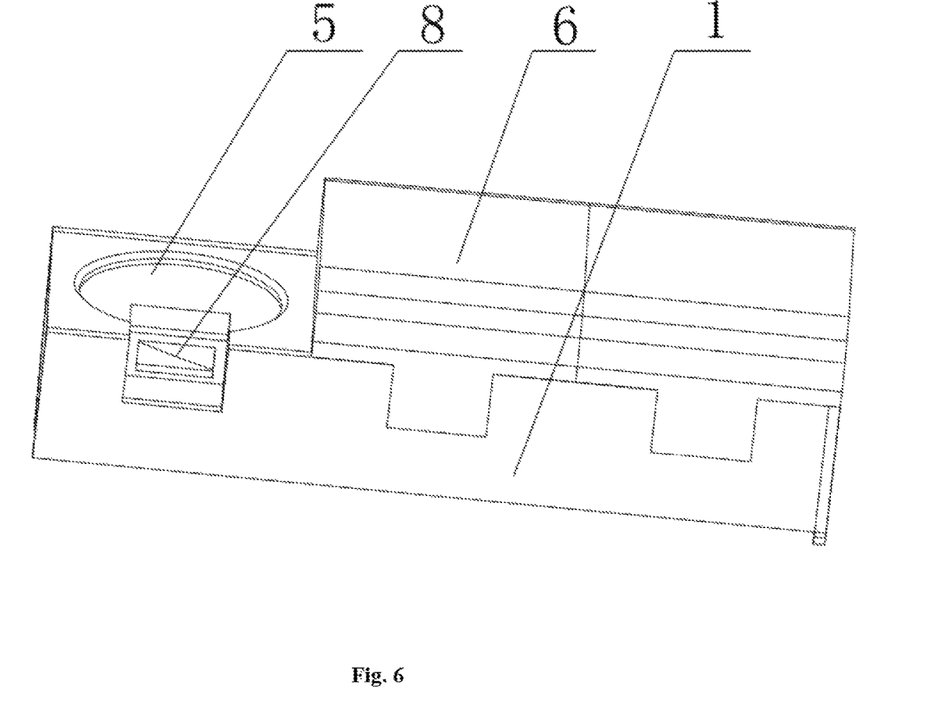
FIG. 6 illustrates a structural diagram of FIG. 1 after removing one of the functional assemblies.

Charger body 1 is a triangle in cross-section, and the three corners of the triangular are processed by chamfering. Comparing to a quadrilateral, a triangular is handier to hold and less likely to slip down. As shown in FIG. 5, all functional assemblies 6 are arranged on the bottom of charger body 1, and fixed connector 9 is inserted in the left side of charger body 1. The actual cross-sectional shape of charger body 1 is an equilateral triangle with three corners removed, which is equivalent to a hexagon, then the six corners of the hexagon are processed by chamfering.

The other end of charger body 1 is also provided with a second USB interface. There is no limitation of the number of the plug-in interfaces, and the plug-in interface is a common USB interface.

The retractable USB assembly comprises a fixed connector and a retractable flap cable box; the fixed connector is provided with a first USB plug and a rotary wheel with circular groove is set in the retractable flap cable box; a second USB plug is clamped and placed in the circular groove and hidden when the retractable flap cable box gathers with the charger body; the rotary wheel is wound with a data cable; one end of the data cable is electrically connected with the first USB plug, and the other end with the second USB plug; the retractable flap cable box is also magnetically connected with charger body 1. The second USB plug can be a joint plug combined by a plurality of different types of USB plugs, thus the second USB plug can be adapted to different USB interface. And the retractable USB assembly is further provided with an indicator light, which will be illuminated when the second USB interface is plugged in for charging.

Figure 7:
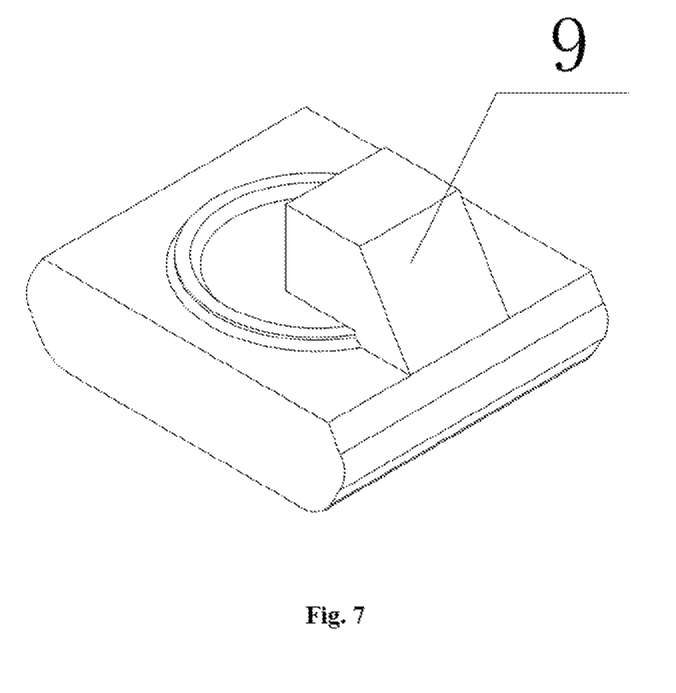
FIG. 7 illustrates a structural diagram of the functional assembly of the multi-functional charger.

The power charging assembly comprises a fixed connector and a flap, the fixed connector is provided with a first USB plug, and the flap with a rechargeable battery; the first USB plug is electrically connected with the rechargeable battery; the fixed connector is fixedly connected with the flap and the flap is also magnetically connected with charger body 1. The retractable USB assembly and the power charging assembly appear to be the same, but different in the internal structure. The flap is not indicated in FIG. 7. The power charging assembly is also provided with an indicator light, which will be illuminated when the circuit board is charging the rechargeable battery and when the power charging assembly is charging other external digital products.

Circuit board 2 is provided with a master control unit (MCU), and a sample identification circuit for digital products is arranged between the master control unit MCU and first USB interface 8 to identify whether to charge or discharge. There are some other function modules on the circuit board, similar to those of common chargers, so are not set forth in detail.

The working theory and steps of the multi-functional charger of the present disclosure includes: first, remove plug cover 10, then take out external charging plug 3, connector 7 and the connecting cable, since all three are connected together it can be taken out together as the whole; the connecting cable is always electrically connected with the circuit board, when external charging plug 3 is plugged into a power socket or a socket, the charger is connected and ready to charge the digital products. The user can take out the retractable flap cable box in the retractable USB assembly in mounting groove 5, and pull out the second USB plug in the circular groove clamped at the retractable flap cable box. The first USB plug on the fixed connector of the retractable USB assembly is usually inserted in first USB interface 8, and the entire retractable USB assembly is equivalent to a double pull USB charging cable, with both ends extendable, the user can start the charging process by inserting the second USB plug to the digital products. Furthermore, since the second USB plug can be a joint plug combined by many different types of USB plugs, it can be applied to different digital products with different USB interfaces. If all the retractable USB assemblies are occupied, the remaining digital products can also be connected to the second USB interface on the other side of charger body 1, but an additional connecting cable will be required. When the data transmission is required for the digital products, the whole retractable USB assembly can act as a USB connecting cable. After taking out the retractable flap cable box, the user should remove fixed connector 9 from charger body 1. The removal of fixed connector 9 can be very convenient for fixed connector 9 and charger body 1 are connected through the insertion of the first USB plug to and first USB interface 8. The whole retractable USB assembly will be detached when the first USB plug is unplugged from first USB interface 8 and functions as a double pull USB charging extension cable, or independently used as a retractable USB cable. If functional assembly 6 connected to charger body 1 is a power charging assembly, as long as external charging plug 3 is plugged into the external power source, the rechargeable battery within the power charging assembly will be continuously charged, and when external charging plug 3 is pulled out from the external power supply, the power charging assembly will turn into a power supply module to charge the digital products plugged in charger body 1 if a certain amount of electric power is stored in the rechargeable battery in the power charging assembly.

What is claimed is:

1. A multi-functional charger comprising:
a charger body, a circuit board and an external charging plug,
wherein the circuit board is arranged in the charger body and electrically connected with the external charging plug; the external charging plug is detachably connected with one end of the charger body and electrically connected with the circuit board through a connecting cable; a containing cavity is formed in the charger body and used for containing the connecting cable; the charger body is further provided with at least one or more mounting grooves, wherein the at least one or more mounting grooves are respectively and detachably connected with a retractable USB assembly for a cable connection and a charging power assembly for electric energy storage; the retractable USB assembly and the charging power assembly are in an electric connection with the circuit board; the charger body and the external charging plug are triangular shaped; and the external charging plug is magnetically connected to the charger body.

2. The multi-functional charger of claim 1, wherein the external charging plug is detachably connected with a connector in the charger body by insertion; one end of the connecting cable is electrically connected with the circuit board, and another end of the connecting cable is electrically connected with the connector.

3. The multi-functional charger of claim 1, wherein two ends of a bottom plate defining the containing cavity bend downward to form an arc-shaped space to place a folded connecting cable at both ends of the containing cavity.

4. The multi-functional charger of claim 1, wherein the at least one or more mounting grooves are each provided with a first USB interface connected with the circuit board, the retractable USB assembly and the charging power assembly are each provided with a fixed connector, a first USB plug is set on the fixed connector, the first USB plug is inserted in the first USB interface, and the retractable USB assembly and the charging power assembly are also magnetically connected with the charger body through magnets arranged at four corners of the retractable USB assembly and the charging power assemble, respectively.

5. The multi-functional charger of claim 4, wherein the retractable USB assembly comprises the fixed connector and a cable retractable flap box that is magnetically connected to the charger body; the fixed connector is provided with the first USB plug and a rotary wheel with a circular groove that is set in the cable retractable flap box; a second USB plug is clamped and placed in the circular groove and hidden when the cable retractable flap box is closed with the charger body; the rotary wheel is wound with a data cable; one end of the data cable is electrically connected with the first USB plug, and another end of the data cable is electrically connected with the second USB plug.

6. The multi-functional charger of claim 4, wherein the power charging assembly comprises the fixed connector and a flap, the fixed connector is provided with the first USB plug, and the flap is provided with a rechargeable battery; the first USB plug is electrically connected with the rechargeable battery; the fixed connector is fixedly connected with the flap and the flap is also magnetically connected with the charger body.

7. The multi-functional charger of claim 1, wherein the connecting cable is further sleeved with a plurality of magnetic covers for easier cable folding.

8. The multi-functional charger of claim 1, wherein three corners of a triangle of the charger body and the external charging plug are processed by chamfering.

9. The multi-functional charger of claim 1, wherein on the other end of the charger body is also provided with a second USB interface.

10. The multi-functional charger of claim 1, wherein the circuit board is provided with a master control unit, and a sample identification circuit is arranged between the master control unit and a first USB interface to identify whether a digital product needs to be charged or discharged.

11. The multi-functional charger of claim 1, wherein three corners of a triangle of the external charging plug are respectively provided with magnets, and the charger body is also made of a magnetic material.

* * * * *